United States Patent
Shreevastav et al.

(10) Patent No.: US 11,229,058 B2
(45) Date of Patent: Jan. 18, 2022

(54) TECHNIQUE FOR GENERATING AND/OR MANAGING RNTIS

(71) Applicant: Telefonaktiebolaget LM Ericsson (publ), Stockholm (SE)

(72) Inventors: Ritesh Shreevastav, Upplands Väsby (SE); Mattias Bergström, Sollentuna (SE); Magnus Stattin, Upplands Väsby (SE); Yutao Sui, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 36 days.

(21) Appl. No.: 16/637,958

(22) PCT Filed: Aug. 1, 2018

(86) PCT No.: PCT/EP2018/070913
§ 371 (c)(1),
(2) Date: Feb. 10, 2020

(87) PCT Pub. No.: WO2019/030084
PCT Pub. Date: Feb. 14, 2019

(65) Prior Publication Data
US 2020/0187263 A1 Jun. 11, 2020

Related U.S. Application Data

(60) Provisional application No. 62/544,095, filed on Aug. 11, 2017.

(51) Int. Cl.
*H04W 74/08* (2009.01)
*H04W 74/00* (2009.01)

(52) U.S. Cl.
CPC ..... *H04W 74/0833* (2013.01); *H04W 74/004* (2013.01)

(58) Field of Classification Search
CPC .................. H04W 74/0833; H04W 74/004
See application file for complete search history.

(56) References Cited

U.S. PATENT DOCUMENTS

2013/0102320 A1  4/2013  Suzuki et al.

FOREIGN PATENT DOCUMENTS

| CN | 106973441 A | 7/2017 |
| WO | 2016158394 A1 | 10/2016 |
| WO | 2017121380 A1 | 7/2017 |

OTHER PUBLICATIONS

Unknown, Author, "3rd Generation Partnership Project; Technical Specification Group Radio Access Network Evolved Universal Terrestrial Radio Access (E-UTRA); Medium Access Control (MAC) protocol specification (Release 14)", 3GPP TS 36.321 V14.3.0, Jun. 2017, pp. 1-107.

(Continued)

*Primary Examiner* — Dinh Nguyen
(74) *Attorney, Agent, or Firm* — Murphy, Bilak & Homiller, PLLC

(57) ABSTRACT

A wireless device is provided that is configured to determine a Random Access-Radio Network Temporary Identifier, RA-RNTI, for use in a radio network system. The wireless device comprises a first counter configured to be incremented after a predefined period of time and to be re-set when having reached a predefined first number, wherein the first counter counts a first count; a second counter configured to be incremented when the first counter reaches the predefined first number and to be re-set when having reached a predefined second number, wherein the second counter counts a second count; and a third counter configured to be incremented when the second counter reaches the predefined second number and to be re-set when having reached a predefined third number, wherein the third counter counts a (Continued)

third count. The wireless device is configured to determine an RA-RNTI at least based on the second count and the third count.

17 Claims, 11 Drawing Sheets

(56) References Cited

OTHER PUBLICATIONS

Unknown, Author, "3rd Generation Partnership Project; Technical Specification Group Radio Access Network Evolved Universal Terrestrial Radio Access (E-UTRA); Physical channels and modulation (Release 14)", 3GPP TS 36.211 V14.3.0, Jun. 2017, pp. 1-195.

Unknown, Author, "New WID on Even further enhanced MTC for LTE", 3GPP TSG RAN Meeting #75; RP-170732; Dubrovnik, Croatia, Mar. 6-9, 2017, pp. 1-4.

Unknown, Author, "Random Access Procedure Remaining Issues", 3GPP TSG-RAN WG2 NB-IoT Adhoc Meeting#2; R2-163228; Sophia Antipolis, France, May 3-4, 2016, pp. 1-6.

Unknown, Author, "RA-RNTI Allocation", 3GPP TSG-RAN2 Meeting #61 bis; R2-081824; Shenzhen, China, Mar. 31-Apr. 4, 2008, pp. 1-4.

Wang, Eric, et al., "A Primer on 3GPP Narrowband Internet of Things", Internet of Things; IEEE Communications magazine, Mar. 2017, pp. 117-123.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Fig. 2

TECHNIQUE FOR GENERATING AND/OR MANAGING RNTIS

TECHNICAL FIELD

The present disclosure generally relates to radio network systems. In particular a technique for generating and managing Radio Network Temporary Identifiers, RNTIs, is described. The technique may be implemented in the form of apparatuses, wireless terminals, network nodes, systems, methods and computer programs, to name a few implementations.

BACKGROUND

The $3^{rd}$ Generation Partnership Project (3GPP) Rel-13 defines a new radio access technology, named NB-IoT, see [1]. NB-IoT is primarily defined for low-throughput, delay-tolerant applications, such as meters and sensors. It enables data rates of just 10's of kbps with 180 kHz of bandwidth, and can provide deep coverage. NB-IoT can be deployed within an existing Long Term Evolution (LTE) band, in guard-band between two regular LTE carriers, or in stand-alone mode, which provides an easy migration path for the re-farmed GSM (2G/GPRS) spectrum.

NB-IoT technology occupies a frequency band of 180 kHz bandwidth, which corresponds to one resource block in LTE transmission. Due to the reduced channel bandwidth, most physical channels have been redesigned: NSSS/NPSS, NPBCH, NRS, NPDCCH (see FIG. 1).

Some of the use cases targeted by NB-IoT are:
Smart metering (electricity, gas and water)
Intruder alarms & fire alarms for homes & commercial properties
Smart city infrastructure such as street lamps or dustbins
Connected industrial appliances such as welding machines or air compressors.

Different coverage extension levels have been defined to cope with different radio conditions. There are typically three coverage enhancement (CE) levels, CE level 0 to CE level 2. CE level 0 corresponds to normal coverage, and CE level 2 to the worst case, where the coverage is assumed to be very poor. The main impact of the different CE levels is that the messages have to be repeated several times especially for CE 2, see [2].

3GPP Rel-14 introduces further enhancements to support positioning, multicast, reduced latency and power consumption, and non-anchor carrier operation in Rel-14, see [2].

Rel-15 aims to introduce a TDD version of NB-IoT. TDD spectrum also exists globally, including regulatory environments and operator markets where there is strong un-met demand for NB-IoT. In some cases this demand has existed since the early phases of the Rel-13 work. Therefore, Rel-15 is the right time to add TDD support into NB-IoT, after establishing what the needed targets in terms of coverage, latency, etc. should be.

TDD mode fundamentally differs from FDD mode. In FDD mode, separate uplink and downlink frames are used. However, in TDD mode, uplink and downlink resources are allocated within the same frame. Some of the subframes are allocated for uplink whereas some are allocated for downlink. In TDD mode different UL/DL configurations are provided as shown in the table of FIG. 2, see also [4] (D=downlink/U=uplink/S=special field (e.g. DwPTS/UpPTS (Uplink/Downlink Pilot Time Slot)).

Random access is a radio network procedure involving the UE and a radio access node initiated by the UE to gain network access. It is essentially the same for both FDD and TDD. A temporary identifier, namely the RA-RNTI, is for example used on the PDCCH (Physical Downlink Control Channel) when Random Access Response messages are transmitted by the radio access node. It unambiguously identifies which time-frequency resource was utilized by the Medium Access Control (MAC) entity of UE to transmit the Random Access Preamble message, see [3].

For NB-IoT FDD UEs, the RA-RNTI associated with the PRACH (Physical Random Access Channel), in which the Random Access Preamble is transmitted, is computed as (see [3]):

$$RA\text{-}RNTI = 1 + floor(SFN\_id/4) + 256 * carrier\_id \quad (1)$$

where SFN_id (sometimes also abbreviated as SFN herein-below) is the index of the first radio frame of the specified PRACH and carrier_id is the index of the UL carrier associated with the specified PRACH. The carrier_id of the anchor carrier is 0.

System Information Broadcast (SIB 2) is used to convey the NPRACH (NB-IoT PRACH) configurations to the UE. The configuration includes details regarding NPRACH resource, frequency location of the NPRACH resource, start time of the NPRACH resource etc.

The above RA-RNTI equation (1) for NB-IoT, which is based on the System Frame Number (SFN), may have a wrap around issue, for example in case of limited resource availability and/or in case of a high number of repetitions needed for UEs located in an extended coverage area. This wrap around issue can lead to collisions among UE utilizing the same RA-RNTI. Specifically, it can easily happen in an NB-IoT scenario (especially in TDD mode) that UEs have the same RA-RNTI because of a wrap around of the SFN, as will now be discussed in greater detail.

The SFN counter counts from 0 to 1023 based upon the subframe number counter. This means that the subframe number counter counts from 0 to 9, which on increment every 10 msec. When the subframe number count reaches 9, the subframe number counter is reset and the SFN counter is incremented. Based on this subframe number and system frame number definitions, the longest time span without resetting SFN to 0 will be 1024*10 msec (10.24 sec).

Assume, for example, that UE A at extended coverage uses subframe number 5 for SFN 500 to send its random access. Thus, according to equation (1) and assuming that carrier_id=0, the following RA-RNTI will be calculated:

$$RA\text{-}RNTI = 1 + floor(500/4) + 256 * 0 = 126$$

After having sent the Random Access Preamble message at subframe number 5 for SFN 500, UE A happens to wait for a Random Access Response message from the network. It may happen that SFN has wrapped around after reaching 1023 and is back to again 500. UE A could have random access repetition needed for up to 128 times.

For NB-IoT FDD mode, one random access duration lasts for 6.4 ms; thus it can be 128*6.4~=8 sec, which is shorter than the 10.24 sec discussed above and thus generally avoids collision problems. For NB-IoT TDD mode, however, different UL and DL configurations are available; thus it could happen that the procedure takes longer either in UL or DL, and UE A may wait longer than 10.24 sec for the Random Access Response message from the network. Meanwhile, UE B, which is in good coverage, could use the same RA-RNTI 126; thus there is a risk of collision.

Similarly, equation (1) provides 256 RA-RNTI values per carrier for NB-IoT FDD mode. For TDD mode, since it would take longer, 256 RA-RNTI will not be sufficient as most of the RA-RNTI could be occupied (in use).

It will be appreciated that similar problems can occur in radio network systems different from NB-IoT that rely on a random access scheme.

SUMMARY

Accordingly, there is a need for a technique of generating and/or managing RNTIs, that avoids one or more disadvantages discussed above, or other disadvantages.

Certain aspects of the present disclosure and their embodiments may provide solutions to these or other challenges. Therefore, there are, proposed herein, various embodiments which address one or more of the issues disclosed herein.

According to a first aspect, a wireless device is provided that is configured to determine a Random Access-Radio Network Temporary Identifier, RA-RNTI, for use in a radio network system. The wireless device comprises a first counter configured to be incremented after a pre-defined period of time and to be re-set when having reached a predefined first number, wherein the first counter counts a first count; a second counter configured to be incremented when the first counter reaches the predefined first number and to be re-set when having reached a predefined second number, wherein the second counter counts a second count; and a third counter configured to be incremented when the second counter reaches the predefined second number and to be re-set when having reached a predefined third number, wherein the third counter counts a third count. The wireless device is configured to determine an RA-RNTI at least based on the second count and the third count.

The wireless device may be a user terminal (e.g., a smartphone, laptop or tablet computer) or an NB-IoT device (e.g., a sensor or sensor system). The wireless device may be configured to perform a random access procedure, for example with the steps defined in [3].

The wireless device may be configured to determine the RA-RNTI by applying one or more mathematical and/or bit-level operations on the second count and the third count and by using the result of these one or more operations (e.g., expressed as a decimal integer value) as the RA-RNTI.

The first, second and third counters may hierarchically be realized on a subframe basis. The first counter may, for example, be a subframe counter. Each subframe may have a dedicated duration defined by the predefined period of time (e.g., in the order of msec, such as 10 msec). The first counter may be configured to count from 0 to the predefined first number (e.g., to 9). The corresponding first count could also be interpreted as a subframe identifier (subframe_id). The second counter may be a system frame number counter, or SFN counter. The second counter may be configured to count from 0 to the predefined second number (e.g., to 1023). The corresponding second count could also be interpreted as an SFN identifier (SFN_id), so SFN and SFN_id are used synonymously herein. The third counter may be a hyper frame counter, or HFN (sometimes also denoted H-SFN) counter. The third counter may be configured to count from 0 to a predefined third number (e.g., to 1023). The corresponding third count could also be interpreted as an HFN identifier (HFN_id), so HFN and HFN_id are used synonymously herein.

The first, second and third counts may correspond to the subframe number, the SFN number and the HFN number, respectively, as presently defined, or as will be defined, in 3GPP specifications (e.g., for NB-IoT), such as 3GPP Rel-13, Rel-14, Rel-15 and later.

The RA-RNTI may identify (e.g., determine) at least a time resource for transmission of a random access request message by the wireless device. The time resource may be represented in terms of one or more of a subframe number, an SFN number and an HFN number. In particular, the second count (e.g., SFN_id) and the third count (e.g., HFN_ID) as used for determining the RA-RNTI may be indicative of the first radio frame of a specified PRACH. In addition, the RA-RNTI may identify a frequency resource for transmission of a random access request message by the wireless device (e.g., in terms of a carrier identifier). In such a case, determination of the RA-RNTI may additionally be based on an index of an uplink carrier associated with the specified PRACH The random access request message may be a Random Access Preamble message (e.g., as defined in 3GPP specifications such as 3GPP Rel-13, Rel-14, Rel-15, or later releases, see also [3] for more details). The Random Access Preamble message may be answered from the network side by a random access response message also associated with (e.g., including) the RA-RNTI determined by the wireless device. The random access messages may be sent on a RACH, including PRACH and NPRACH. The random access messages may generally conform to 3GPP specifications (e.g., for NB-IoT), such as 3GPP Rel-13, Rel-14, Rel-15 and later (see, e.g., [3] for more details).

The wireless device may be configured to determine the RA-RNTI responsive to a decision that a random access is to be performed. For example, in preparation for transmission of a random access request message (such as a random Access Preamble message), the wireless device may trigger identification (e.g., determination) of a time (and, optionally, a frequency) resource for the transmission of the random access message. The RA-RNTI may then in a next step be determined on the basis of the identified time (and, optionally, frequency) resource. The time resource may be indicated by the second count and the third count as underlying the RA-RNTI determination.

The wireless device may be configured to determine a number x of different RA-RNTIs that exceeds a constant a plus the floor of the pre-defined second number y divided by a constant z so that $$x > a + \text{floor}(y/z).$$

In some variants, a=1 or a=1 plus 256 times a maximum uplink carrier index. The uplink carrier index may be associated with a particular frequency resource (e.g., for transmission of the random access message). Different frequency resources (e.g., carriers) may have different indices, including the maximum uplink carrier index as the highest index (e.g., the largest integer number) of all such indices. In some variants, y=1023. In some variants, z=4. (see, e.g., [3]).

The number x of different RA-RNTIs may exceed 260 or 520 or 1040 or 2080 or 5150. The number x of different RA-RNTIs may exceed the second predefined number. It may equal the product of the first predefined number and the third predefined number (e.g., in terms of y) or it may exceed the second predefined number but be less than that product. In the latter case, a further parameter may enter the RA-RNTI determination to render the resulting number space smaller than that product (e.g., in terms of a quotient z).

The wireless device may be configured to determine the RA-RNTI based on a mathematical formula that includes both the second count and the third count. As an example, the wireless device may be configured to determine the RA-RNTI based on a+floor(y/z), for example according to $$RA\text{-}RNTI=a+\mathrm{floor}(y/z), \text{ wherein}$$

a is an integer including one of: 0; 1; a number >1; and 1+an integer multiple of an uplink carrier index; y is an integer determined on the basis of both the second count and the third count; and z is an integer including one of: 1 and a number >1. In some cases, y is configured to exceed the predefined second number.

In some cases, the wireless device is configured to determine the RA-RNTI based on $$1+\mathrm{floor}((b+(c+1)*\mathrm{mod}(d,e))/z)+f,$$

for example according to $$RA\text{-}RNTI=1+\mathrm{floor}((b+(c+1)*\mathrm{mod}(d,e))/z)+f, \text{ wherein}$$

b is the second count; c is the second predefined number; d is the third count; e is an integer including 1; z is an integer including 1; and f is an integer including 0, 1 or a number >1. In some variants, f may be defined as follows $$f=(c+1)*e/z*\mathrm{carrier\_id}, \text{ wherein}$$

carrier_id is an uplink carrier index.

The wireless device may be configured to determine the RA-RNTI based on a bit-level operation applied to binary representations of the second count and the third count. As an example, the wireless device may be configured to determine the RA-RNTI based on a binary number that has been generated by appending one or more bits of a binary representation of the third count to a binary representation of the second count. As a more detailed example, one or more least significant bits of the binary representation of the third count may be appended (e.g., prepended) to at least a portion of the binary representation of the second count (e.g., to the most significant bit side of that binary representation). The decimal integer corresponding to the resulting binary number may be used as the RA-RNTI.

The wireless device may be configured to generate a random access request message in accordance with the RA-RNTI and send the random access request message towards an access network. The random access request message, such as a Random Access Preamble message, may be sent on the time (and, optionally, frequency) resource corresponding to the RA-RNTI. The RA-RNTI itself may or may not be included in the random access request message.

The wireless device may be configured to additionally, or in the alternative, identify a random access response message from the access network associated with the RA-RNTI. The RA-RNTI itself may or may not be included in the random access response message.

The wireless device may be configured to determine the RA-RNTI based on an expression that yields a uniform distribution of RA-RNTI values.

In one exemplary realization, the above parameters are set and defined as follows b is a system frame number;
c=1023;
d is a hyper frame number;
e=2 or 4; and
z=4.

The wireless device may be configured to determine the RA-RNTI according to $$RA\text{-}RNTI=1+\mathrm{floor}((b/4)+1024*\mathrm{mod}(d,2)), \text{ wherein}$$

b is the second count (e.g., SFN);
d is the third count (e.g., HFN).

The wireless device may be a Narrowband Internet of Things User Equipment, NB-IoT UE, configured to determine the RA-RNTI for a Time Division Duplex, TDD, mode.

According to a further aspect, an access network node configured to determine a Random Access-Radio Network Temporary Identifier, RA-RNTI, for use in a radio network system is provided. The access network node comprises a first counter configured to be incremented after a pre-defined period of time and to be re-set when having reached a predefined first number, wherein the first counter counts a first count; a second counter configured to be incremented when the first counter reaches the predefined first number and to be re-set when having reached a predefined second number, wherein the second counter counts a second count; and a third counter configured to be incremented when the second counter reaches the predefined second number and to be re-set when having reached a predefined third number, wherein the third counter counts a third count. The access network node further comprises an interface configured to receive a random access message from a wireless device and is configured to determine an RA-RNTI associated with the random access message based on the second count and the third count at the time when the random access message was received.

Determination of the RA-RNTI may be based on the same principle (e.g., based on the same mathematical formula or operations or based on the same bit-level operations) as discussed above and below in regard to the wireless device.

The access network node may be configured to generate a random access response message in accordance with (e.g., that includes) the RA-RNTI and send the random access response message to the wireless device. The random access response message may be generated in response to receipt of a random access request message (e.g., a Random Access Preamble message) from the wireless devices. The random access messages may be sent on a Random Access Channel (RACH), including PRACH and NPRACH.

The access network node may be configured to manage (e.g., one or more of determine, use, compare, send, etc.) a first RNTI type comprising a number (e.g., a given set) of designated RA-RNTIs available for use in the radio network system and at least one second RNTI type different from the first type. The access network node may be configured to determine, based on a priori-knowledge, one or more designated RA-RNTIs available but unused in the radio network system. The access network node may be configured to allocate the one or more unused designated RA-RNTIs to the second RNTI type.

The identifiers (designated RA-RNTIs) thus allocated to the second RNTI type may subsequently be assigned by the access network node to wireless devices.

Exemplary second RNTI types include a Cell-RNTI (C-RNTI) type and a temporary C-RNTI type. The a priori-knowledge may relate to information about which RA-RNTIs within a given RA-RNTI set will remain unused in view of system constraints. The a priori-knowledge may relate to communication opportunities on a transmission channel (e.g., the RACH, including the PRACH and/or NPRACH). In particular, the a priori-knowledge may relate to one or more RACH configurations that are not valid, and thus unusable, for random access request messages by the wireless device. Of course, such designate RA-RNTIs will never be used by any wireless device and, thus, remain unnecessarily occupied. In case the one or more RACH configurations change at a later point in time, the determination and allocation steps may be repeated. In such a case, for example C-RNTIs or temporary C-RNTIs may have to be revoked and/or re-allocated to RA-RNTIs. Alternatively, or in addition, previously allocated identifiers (RNTIs) as needed for a new RACH configuration may be reserved (e.g., not allocated in regard to the second RNTI type) as they become free (e.g., as connections are released)

The given set of designated RA-RNTIs may be defined by an underlying RA-RNTI determination principle as discussed above and below (e.g., by a mathematical formula or mathematical operations or by bit-level operations).

By allocating (or, actually, re-allocating or re-mapping) an identifier (e.g., an integer number) originally designated as (or allocated or mapped to) a RA-RNTI to another RNTI type, such as using that number as one of a C-RNTI and a temporary C-RNTI, the identifier space for the other RNTI type can be increased. As such, a potential decrease of the identifier space for the other RNTI type that results from the desired increase of the identifier space for the RA-RNTI type can at least partially be compensated.

The access network node may be configured to determine the RA-RNTI according to

RA-RNTI=1+floor($(b/4)$)+1024*mod($d$,2), wherein b is the second count (e.g., SFN);
d is the third count (e.g., HFN).

The access network node may be configured to determine the RA-RNTI for a Time Division Duplex, TDD, mode.

In view of the above, there is also provided an access network node for managing Radio Network Temporary Identifiers, RNTIs, for use in a radio network system, the RNTIs belonging to a first RNTI type comprising a number of designated Random Access-, RA-, RNTIs and a second RNTI type different from the first type. The access network node is configured to determine, based on a priori-knowledge, one or more designated RA-RNTIs available but unused in the radio network system; and to allocate the one or more unused designated RA-RNTIs to the second RNTI type.

Further provided is a radio network system including one or more of the wireless devices discussed herein and/or at least one access network node discussed herein.

The radio network system may be configured to operate in a Time Division Duplex, TDD, mode. The radio network system may further be configured to also operate in a Frequency Division Duplex, FDD, mode. The radio network system may conform to 3GPP Rel-13, Rel-14, Rel-15 or higher. The radio network system may be configured to conform to 3GPP NB-IoT specifications.

Also provided is a method of determining a Random Access-Radio Network Temporary Identifier, RA-RNTI, for use in a radio network system, the method being performed by a wireless device and comprising operating a first counter configured to be incremented after a pre-defined period of time and to be re-set when having reached a predefined first number, wherein the first counter counts a first count; operating a second counter configured to be incremented when the first counter reaches the predefined first number and to be re-set when having reached a predefined second number, wherein the first counter counts a first count; operating a second counter configured to be incremented when the first counter reaches the predefined first number and to be re-set when having reached a predefined second number, wherein the second counter counts a second count; and operating a third counter configured to be incremented when the second counter reaches the predefined second number and to be re-set when having reached a predefined third number, wherein the third counter counts a third count; and determining an RA-RNTI at least based on the second count and the third count.

Further provided is a method of determining a Random Access-Radio Network Temporary Identifier, RA-RNTI, for use in a radio network system, the method being performed by an access network node and comprising operating a first counter configured to be incremented after a pre-defined period of time and to be re-set when having reached a predefined first number, wherein the first counter counts a first count; operating a second counter configured to be incremented when the first counter reaches the predefined first number and to be re-set when having reached a predefined second number, wherein the second counter counts a second count; operating a third counter configured to be incremented when the second counter reaches the predefined second number and to be re-set when having reached a predefined third number, wherein the third counter counts a third count; receiving a random access message from a wireless device; and determining an RA-RNTI associated with the random access message based on the second count and the third count at the time when the random access message was received.

Still further provided is a method of managing Radio Network Temporary Identifiers, RNTIs, for use in a radio network system, the RNTIs belonging a first RNTI type comprising a number of designated Random Access-, RA-, RNTIs and a second RNTI type different from the first type, wherein the method comprises determining, based on a priori-knowledge, one or more designated RA-RNTIs available but unused in the radio network system; and allocating the one or more unused designated RA-RNTIs to the second RNTI type.

The methods presented herein may comprises further steps as explained above and below.

Also provided is a computer program product comprising software code portions for performing the steps of the methods presented herein when executed on a computing device. The computer program product may be stored on a computer-readable recording medium, such as a semiconductor memory, a CD-ROM, etc.

Also provided is an apparatus comprising a processor and a memory coupled to the processor, wherein the memory stores program code that performs one of the methods presented herein when executed by the processor.

BRIEF DESCRIPTION OF THE DRAWINGS

The drawings illustrate exemplary scenarios of where and how the present disclosure can be implemented. In more detail.

FIG. 2 illustrates a TDD embodiment;

DETAILED DESCRIPTION

Some of the embodiments contemplated herein will now be described in greater detail with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the present disclosure to those skilled in the art.

Figure 1:
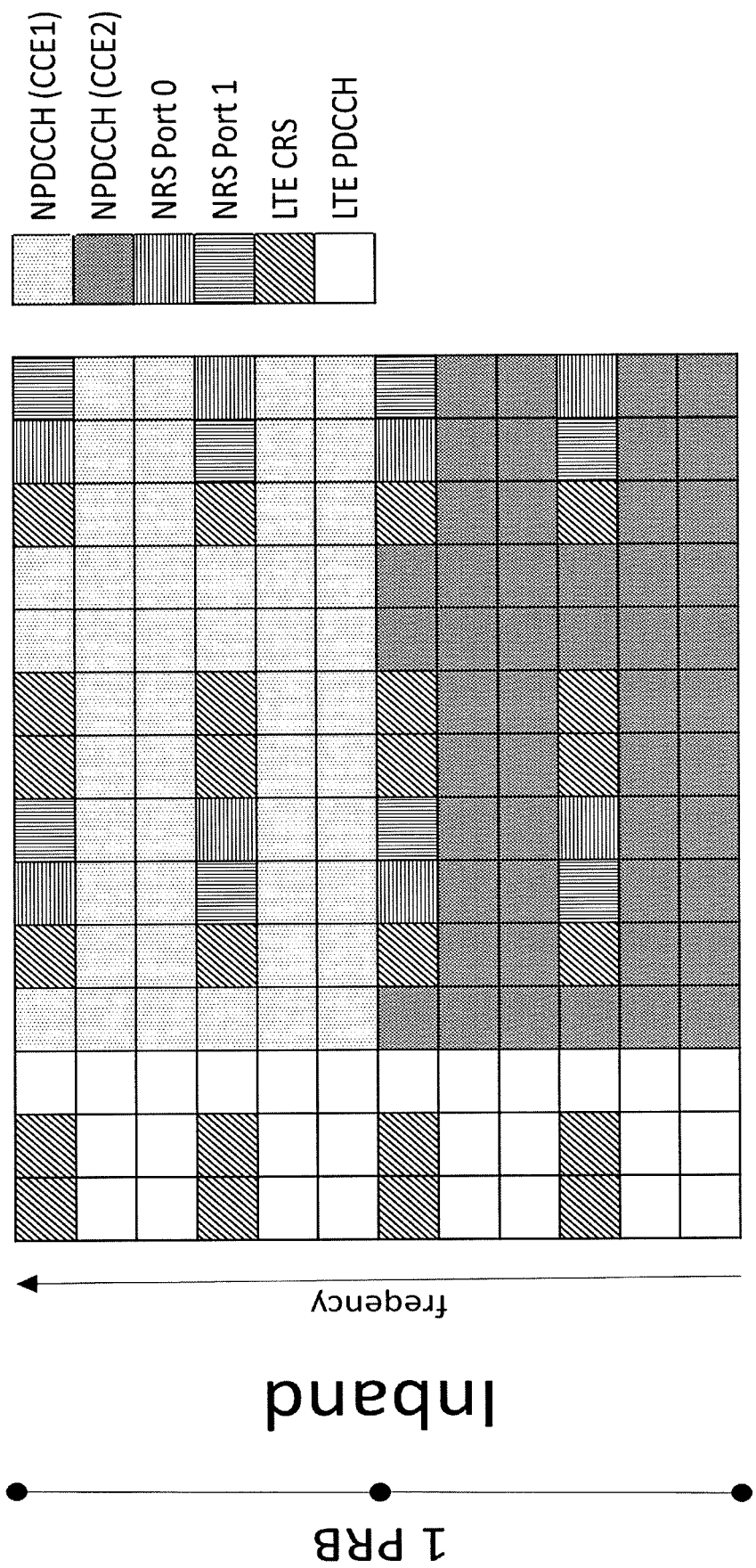
FIG. 1 illustrates an NB-IoT Physical Resource Block, PRB, embodiment.
Figure 3:
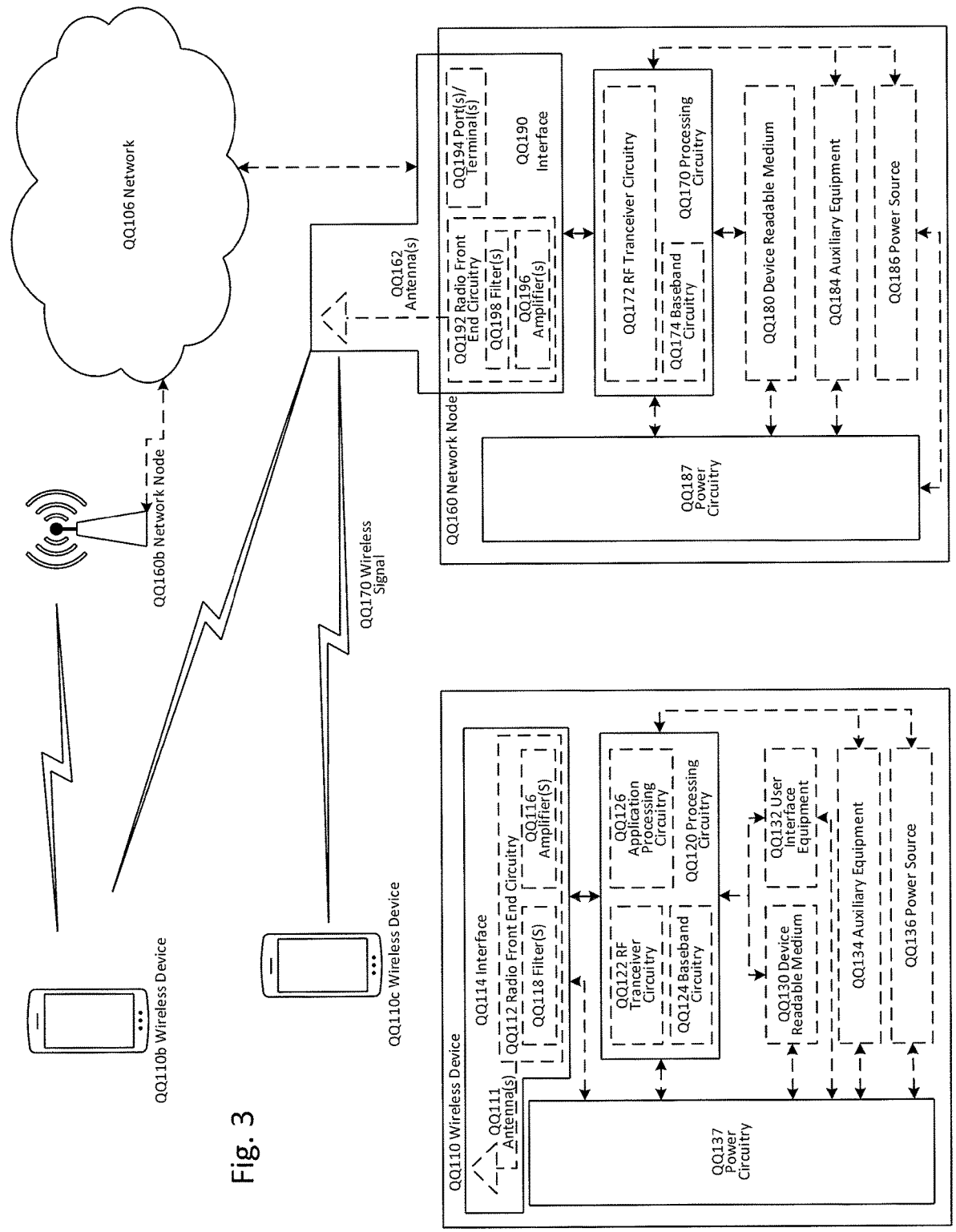
FIG. 3 illustrates a system embodiment with wireless device and network node embodiments.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards including in particular NB-IoT; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 3 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.), personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments hosted by one or more of hardware nodes. Further, in embodiments in which the virtual node is not a radio access node or does not require radio connectivity (e.g., a core network node), then the network node may be entirely virtualized.

The functions may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in virtualization environment which provides hardware comprising processing circuitry and a memory. The memory contains instructions executable by processing circuitry whereby an application is operative to provide one or more of the features, benefits, and/or functions disclosed herein.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the following, various examples and embodiments are described that are based on the examples and embodiments described above in the Summary section and may be combined therewith. All the examples and embodiments pertain to RNTIs. RNTIs are identifiers used to differentiate/identify a connected mode UE in the cell, a specific radio channel, a group of UEs in case of paging, a group of UEs for which power control is issued by the access network node, system information transmitted for all the UEs by the access network node, and so on. There are a several RNTI types, such as SI-RNTI, P-RNTI, C-RNTI, Temporary C-RNTI, SPS-CRNTI, TPC-PUCCH-RNTI, TPC-PUSCH-RNTI, RA-RNTI, and M-RNTI.

Figure 4A:
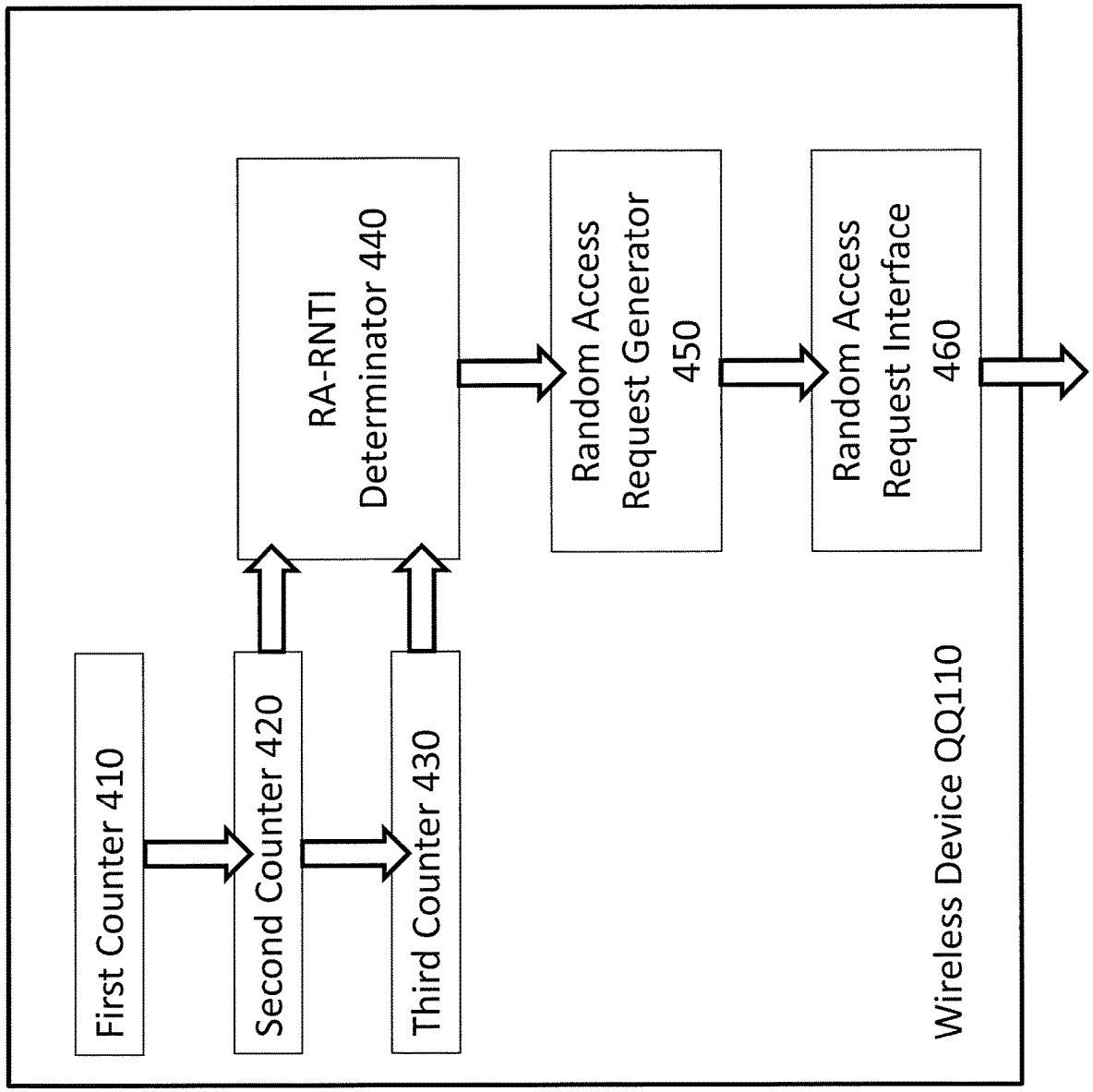
FIGS. 4A, B illustrate wireless device embodiments.
Figure 5:
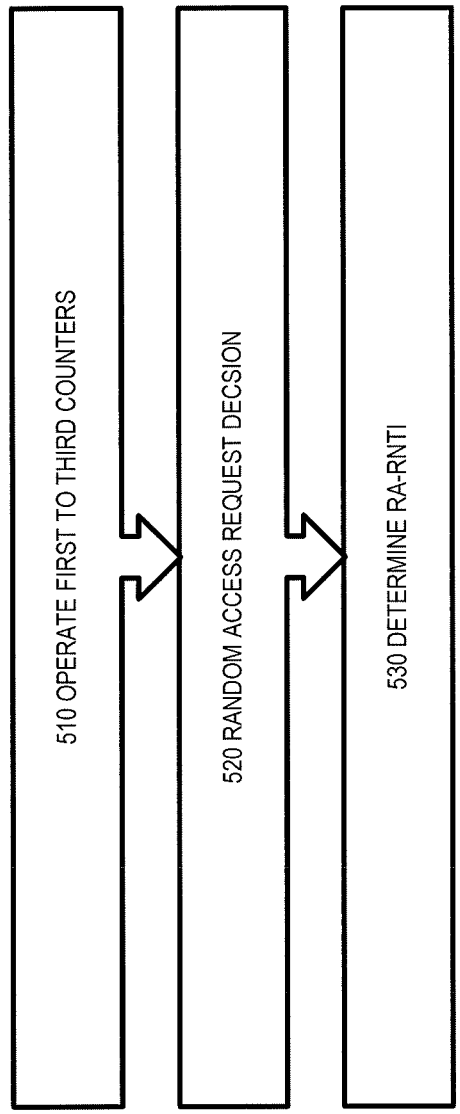
FIG. 5 illustrates a method embodiment in regard to a wireless device.

FIGS. 4A and B show embodiments of a wireless device QQ110 of FIG. 3 and its functional components (that may be realized, at least in part, by the processing circuitry QQ120). The wireless device QQ110 is configured to determine an RA-RNTI for use in a radio network system illustrated in FIG. 3. FIG. 5 illustrates the corresponding operations in a method embodiment.

According to the embodiment of FIG. 4A, the wireless device QQ110 comprises a first counter 410 configured to be incremented after a pre-defined period of time and to be re-set when having reached a predefined first number. The first counter 410 counts a first count, such as subframes. Also provided is a second counter 420 configured to be incremented when the first counter 410 reaches the predefined first number and to be re-set when having reached a predefined second number. The second counter 420 counts a second count, such as SFNs. Also provided is a third counter 430 configured to be incremented when the second counter 420 reaches the predefined second number and to be re-set when having reached a predefined third number. The third counter counts a third count, such as HFNs. All the three counters 410, 420 and 430 are continuously operated as illustrated by the step 510 in FIG. 5.

The wireless device QQ110 is configured to determine an RA-RNTI at least based on the second count and the third count. To this end the wireless device QQ110 comprises an RA-RNTI determinator 440. This determinator 440 may be triggered to determine the RA-RNTI each time it is decided that a random access request is to be sent by the wireless device QQ110 (see steps 520 and 530, which are essentially performed in parallel with step 510). The RA-RNTI is, for example, generated in accordance with time and, optionally, frequency resources on which a random access request message is to be sent. The corresponding triggering component is not illustrated in FIG. 4A. When triggered, the determinator 440, in turn, triggers a random access request generator 450 to generate a random access request message (e.g., a Random Access Preamble message) in accordance with the RA-RNTI and to send the random access request message on the PRACH to the network node QQ160 of FIG.

3 in accordance with time and, optionally, frequency resources as defined in by the RA-RNTI.

The RA-RNTI determinator 440 may be operated to determine the RA-RNTI as described in greater detail above and below.

Figure 4B:
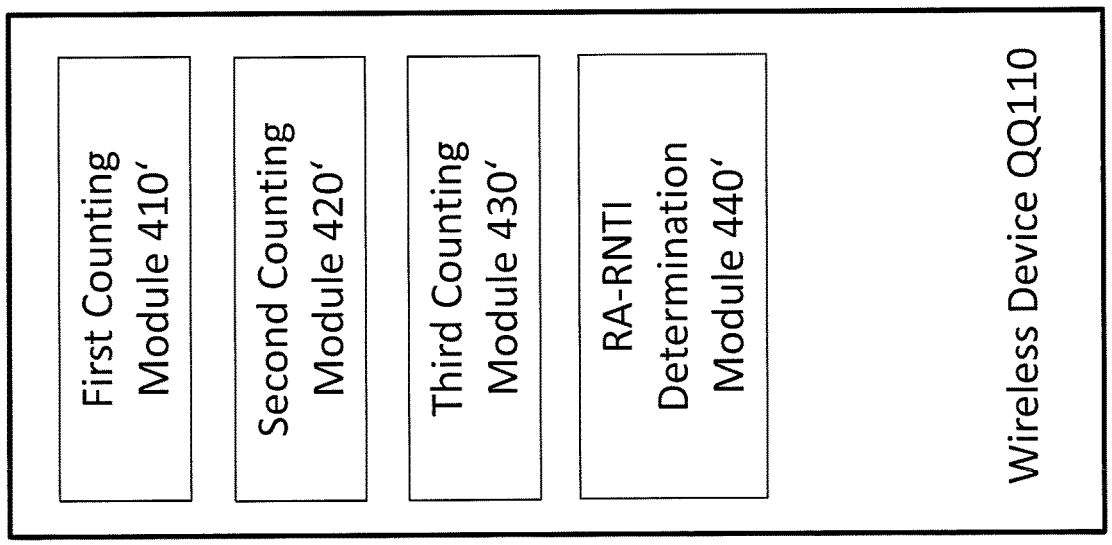

According to the embodiment of FIG. 4B, the wireless device QQ110 comprises a first counting module 410' configured to be incremented after a pre-defined period of time to count a first count and to be re-set when having reached a predefined first number. Also provided is a second counting module 420' configured to be incremented when the first counting module 410' reaches the predefined first number and to be re-set when having reached a predefined second number. The second counting module 420' counts a second count, such as SFNs. Also provided is a third counting module 430' configured to be incremented when the second counting module 420' reaches the predefined second number and to be re-set when having reached a predefined third number. The third counting module 430' counts a third count, such as HFNs. All the three modules 410', 420' and 430' are continuously operated as illustrated by step 510 in FIG. 5. The wireless device QQ110 is configured to determine an RA-RNTI at least based on the second count and the third count. To this end the wireless device QQ110 comprises an RA-RNTI determination module 440' that functionally corresponds to the RA-RNTI determinator 440.

Figure 6A:
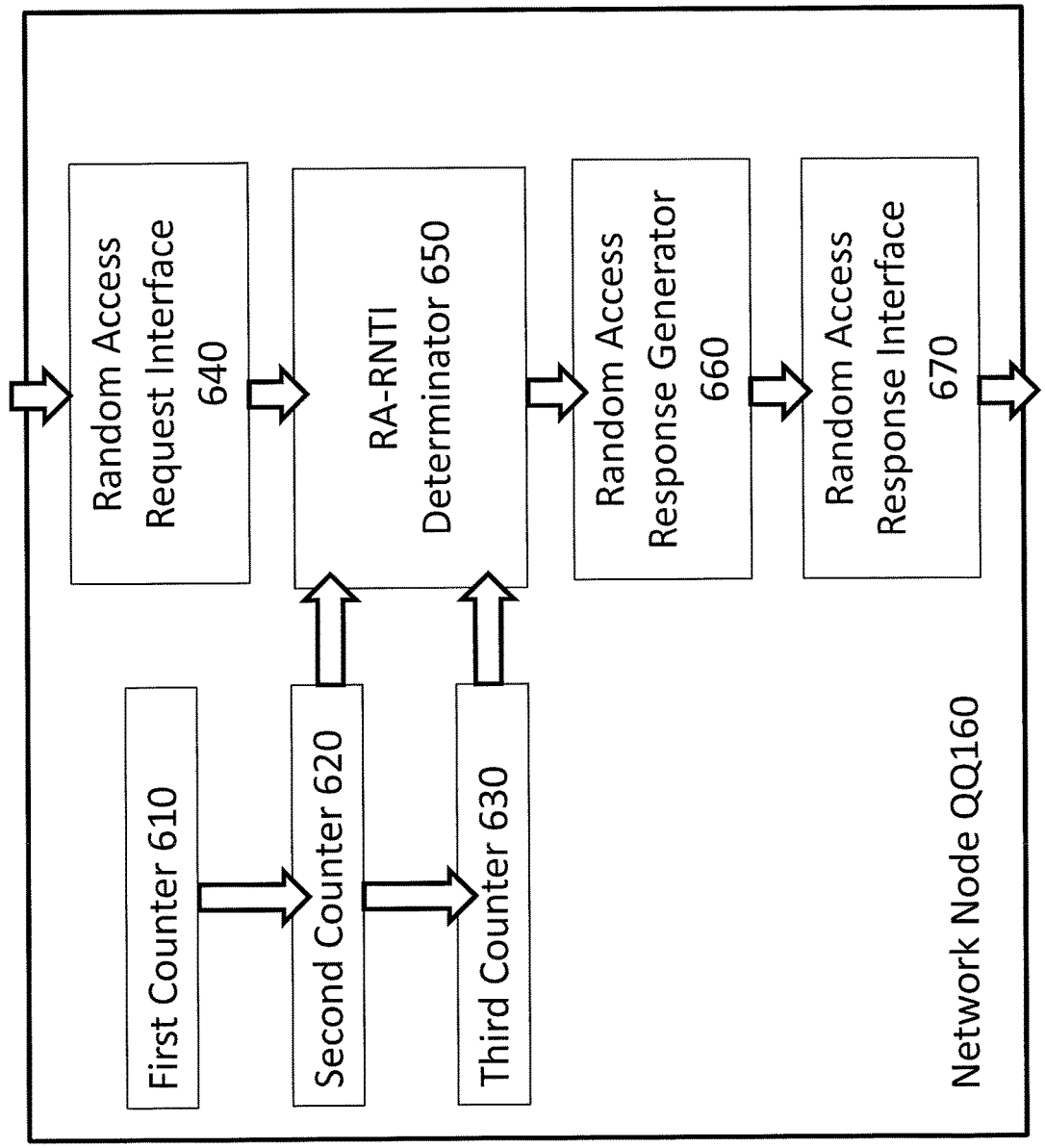
FIGS. 6A, B illustrates network node embodiments.
Figure 6B:
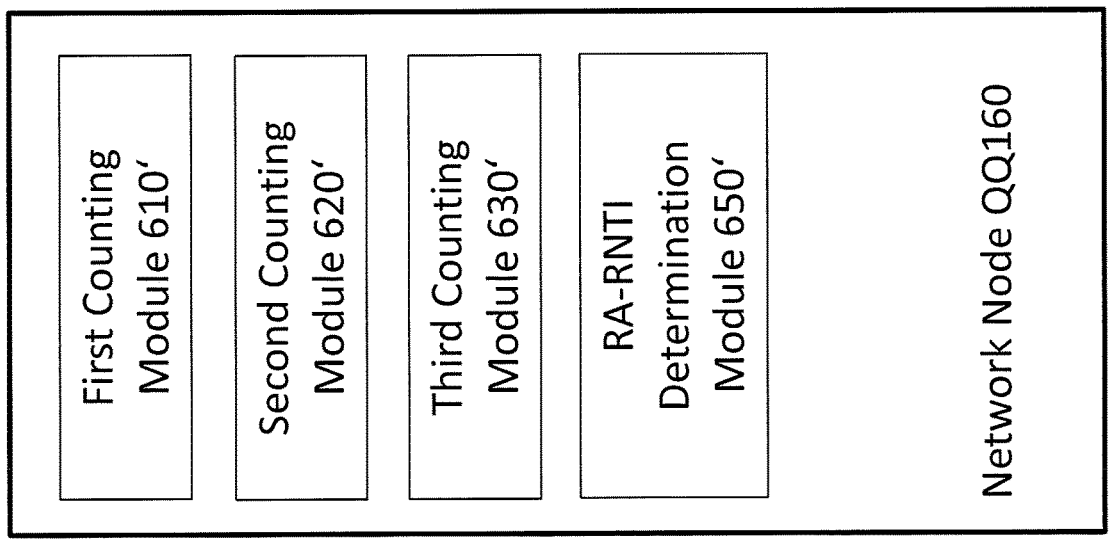
Figure 7:
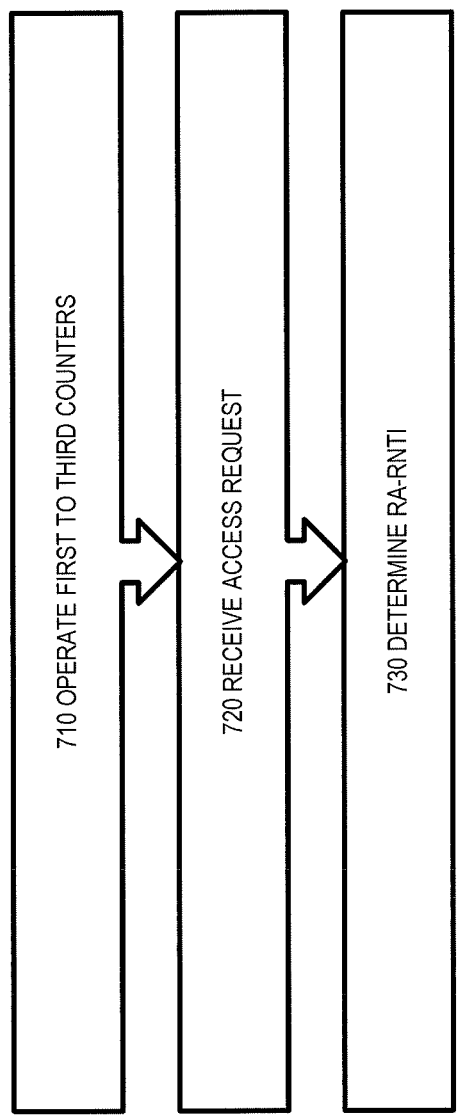
FIG. 7 illustrates a method embodiment in regard to a network node.

FIGS. 6A and 6B show embodiments of a network node QQ160 of FIG. 3 and its functional components (that may be realized, at least in part, by the processing circuitry QQ170). The network node QQ160 is configured as an access network node configured to determine an RA-RNTI for use in a radio network system illustrated in FIG. 3. FIG. 7 illustrates the corresponding operations in a method embodiment.

According to the embodiment of FIG. 6A, the access network node QQ160 comprises a first counter 610 configured to be incremented after a pre-defined period of time and to be re-set when having reached a predefined first number. The first counter 610 counts a first count, such as subframes. Also provided is a second counter 620 configured to be incremented when the first counter 610 reaches the predefined first number and to be re-set when having reached a predefined second number. The second counter 620 counts a second count, such a SFNs. Also provided is a third counter 630 configured to be incremented when the second counter 620 reaches the predefined second number and to be re-set when having reached a predefined third number. The third counter counts a third count, such as HFNs. All the three counters 610, 620 and 630 are continuously operated as illustrated by step 710 in FIG. 7.

The access network node QQ160 further comprises an interface 640 configured to receive a random access request message from a wireless device QQ110 (step 720) via the PRACH. The access network node QQ160 comprises an RA-RNTI determinator 650 configured to determine an RA-RNTI associated with the received random access request message based on the second count and the third count at the time when the random access request message was received at the interface 640 (step 730). The RA-RNTI determinator 650 may be operated to determine the RA-RNTI as described in greater detail above and below.

The access network node QQ160 also comprises a random access response generator 660 that generates a random access response message in accordance with the RA-RNTI as determined in step 730. The random access response message is then sent via a random access response interface 670 back to the wireless device QQ110. The random access response message may include a temporary RNTI for further use, such as a Temporary Cell-RNTI.

According to the embodiment of FIG. 6B, the access network node QQ160 comprises a first counting module 610' configured to be incremented after a pre-defined period of time and to be re-set when having reached a predefined first number. The first counting module 610' counts a first count, such as subframes. Also provided is a second counting module 620' configured to be incremented when the first counting module 610' reaches the predefined first number and to be re-set when having reached a predefined second number. The second counting module 620' counts a second count, such a SFNs. Also provided is a third counting module 630' configured to be incremented when the second counting module 620' reaches the predefined second number and to be re-set when having reached a predefined third number. The third counting module 630' counts a third count, such as HFNs. All the three counting modules 610', 620' and 630' are continuously operated as illustrated by step 710 in FIG. 7.

The access network node QQ160 also comprises an RA-RNTI determination module 650' configured to determine an RA-RNTI associated with the received random access request message based on the second count and the third count at the time when the random access request message was received (step 730). The RA-RNTI determination module 650' may be operated to determine the RA-RNTI as described in greater detail above and below.

It will be appreciated that the complete random access procedure may comprise additional steps. As an example, the wireless device QQ110 may respond to the random access response message with a RRC Connection Request message. The RRC Connection Request message may be sent using the Temporary Cell-RNTI. The access network node QQ160 may then respond with a RRC Connection Setup message carrying an non-temporary C-RNTI.

In the following detailed embodiments, HFN count is introduced for NB-IoT UEs. HFN is a counter (sometimes also referred to as timer) at the next level to SFN; thus RA-RNTI determination, if based upon HFN, could assist in resolving the wrap around issue and other issues, in expanding the RA-RNTI space for NB-IoT TDD users and in sharing the expanded RA-RNTI space. In some one of the embodiments of the present disclosure, it is defined that HFN is used in combination with SFN for calculation of the RA-RNTI used for transmitting/receiving a random access response.

The examples and embodiments, in particular for calculation/determining of RA-RNTI, are in the following partially described in the context of NB-IoT TDD, but can be applied to other radio technologies and/or systems. The examples and embodiments can in particular be implemented in the contexts discussed above in regard to FIGS. 4 to 7, and at least partially within the RA-RNTI determinators 440, 650.

The examples and embodiments provide, among others, a technique for a wireless device to determine the RA-RNTI used in receiving of a random access response.

One example, for example performed by a wireless device QQ110, comprises determining at least a part of the HFN, the SFN, and optionally a carrier id, associated with a random access transmission, determining, based on the at least a part of the HFN and the SFN (or on the HFN, the SFN and, optionally the carrier id), the RA-RNTI, and receiving, using the RA-RNTI, a random access response message. Receiving may comprise identifying a specific random access response message as being addressed to the wireless device based on the associated RA-RNTI.

The present disclosure also provides a technique for a network node QQ160 to determine the RA-RNTI to be used in transmitting of a random access response. The method comprises determining at least a part of the HFN (e.g., the third count discussed above), the SFN (e.g., the second count discussed above), and optionally a carrier id, associated with a random access transmission (e.g., a received random access request message), determining, based on the at least a part of the HFN and the SFN (or on the HFN, the SFN and the carrier id) the RA-RNTI, and transmitting, using the RA-RNTI, a random access response message.

In some embodiments, the RA-RNTI is determined so that it is the equivalent of the expression:

RA-RNTI=1+Floor((SFN+(SFNMAX+1)*mod(HFN,$n$))/$X$)

or, if the parameter carrier_id is used:

RA RNTI=1+Floor((SFN+(SFNMAX+1)*mod(HFN,$n$))/$X$)+(SFNMAX+1)*$n$/$X$*carrier_id wherein n can be selected as how many cycles of SFN should be comprised (a parameter sometimes also referred to as sfnCycle(s) and that can be configured by the upper layers), X can be selected as how compact the RA-RNTI values should be, SFNMAX is the maximum SFN value, and carrier_id is a carrier identifier. It will be understood that these parameters can readily be mapped on the parameters discussed in the Summary section above.

In some embodiments, the determination comprises prepending one or more LSBs (least significant bits) of the binary representation of HFN to the MSB (most significant bit) side of the binary representation of SFN.

In some embodiments the determination comprises calculation or evaluation of a formula. Exemplary formulae are presented below:

RA-RNTI=1+Floor((SFN+(SFNMAX+1)*mod(HFN,$n$))/$X$)

RA-RNTI=1+Floor((SFN+(SFNMAX+1)*mod(HFN,$n$))/$X$)+(SFNMAX+1)*$n$/$X$*carrier_id RA-RNTI=1+Floor((SFN+1024*mod(HFN,$n$))/$X$)+1024*$n$/$X$*carrier_id wherein n can be selected as how many cycles of SFN wrap around is desired, X can be selected as how compact the RA-RNTI values should be, carrier_id is a carrier identifier, and SFNMAX is the maximum SFN value. It will be understood that these parameters can readily be mapped on the parameters discussed in the Summary section above.

Another exemplary formula is:

RA-RNTI=1+Floor(SFN/4*(mod(HFN,$n$)+1))+256*$n$*carrier_id wherein n can be selected as how many cycles of SFN wrap around is desired, and carrier_id is a carrier identifier.

With the above formulae, it is possible to extend the RA-RNTI range so that RA-RNTI wrap-around/ambiguity is avoided.

As has been explained above, in some embodiments, the RA-RNTI is determined so that it is the equivalent of the expression:

RA-RNTI=1+Floor((SFN+(SFNMAX+1)*mod(HFN,$n$))/$X$).

Assuming that SFNMAX is chosen to equal 1023 (e.g., as defined for NB-IoT, see also parameter c above) and X is chosen to equal 4 (see parameter z above), this expression can be re-written as follows:

RA-RNTI=1+Floor((SFN+1024*mod(HFN,$n$))/4.

The above expression is equivalent to:

RA-RNTI=1+Floor((SFN/4+256*mod(HFN,$n$)).

Assuming further that n is exemplarily chosen to equal 2, the above expression can be re-written as follows:

RA-RNTI=1+Floor((SFN/4+256*mod(HFN,2)).

The above expression, in turn, is equivalent to:

RA-RNTI=1+Floor(SFN/4)+256*mod(HFN,2).

Figure 8A:
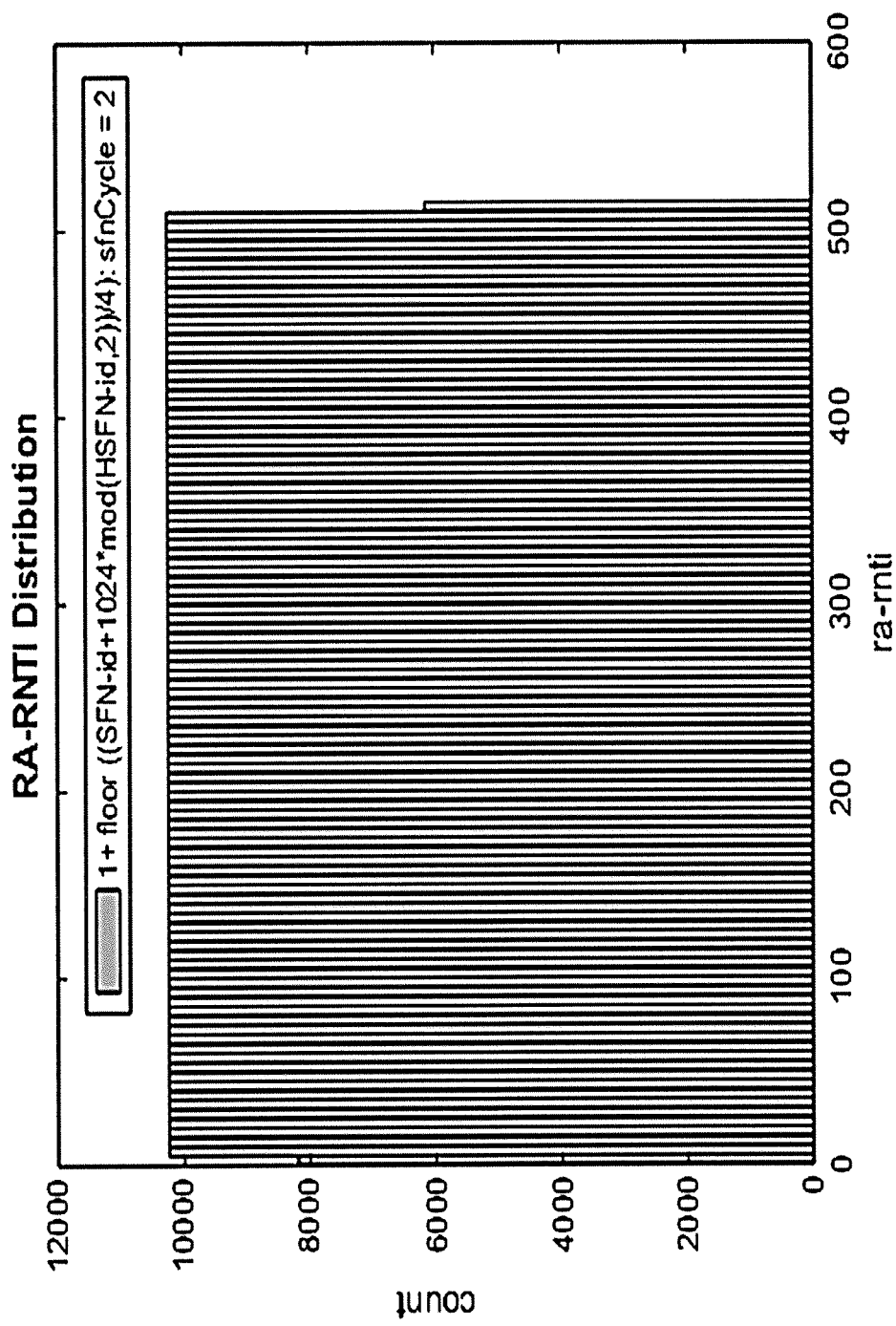
FIGS. 8A, B illustrate exemplary distributions of RA-RNTI values.

The first term in the above expression is always 1. The second term can assume any value between 0 and 255 (assuming that SFN ranges between 0 and 1023, for example in an NB-IoT scenario). The third term 256*mod(HFN,2) yields either 0 or 256, depending on the value of HFN. Consequently, as SFN is incremented and wraps around, leading to an incrementation of HFN, a symmetric distribution of RA-RNTI values is obtained as illustrated in FIG. 8A. Such a uniform distribution is generally desired to realize an efficient use of the whole range of RA-RNTI values.

Such a uniform distribution could also be obtained if n is set to, for example, 4.

In contrast, no uniform distribution is obtained for other expressions of RA-RNTI, such as RA-RNTI=1+Floor(SFN/4)+4096*mod(HFN,2).

Figure 8B:
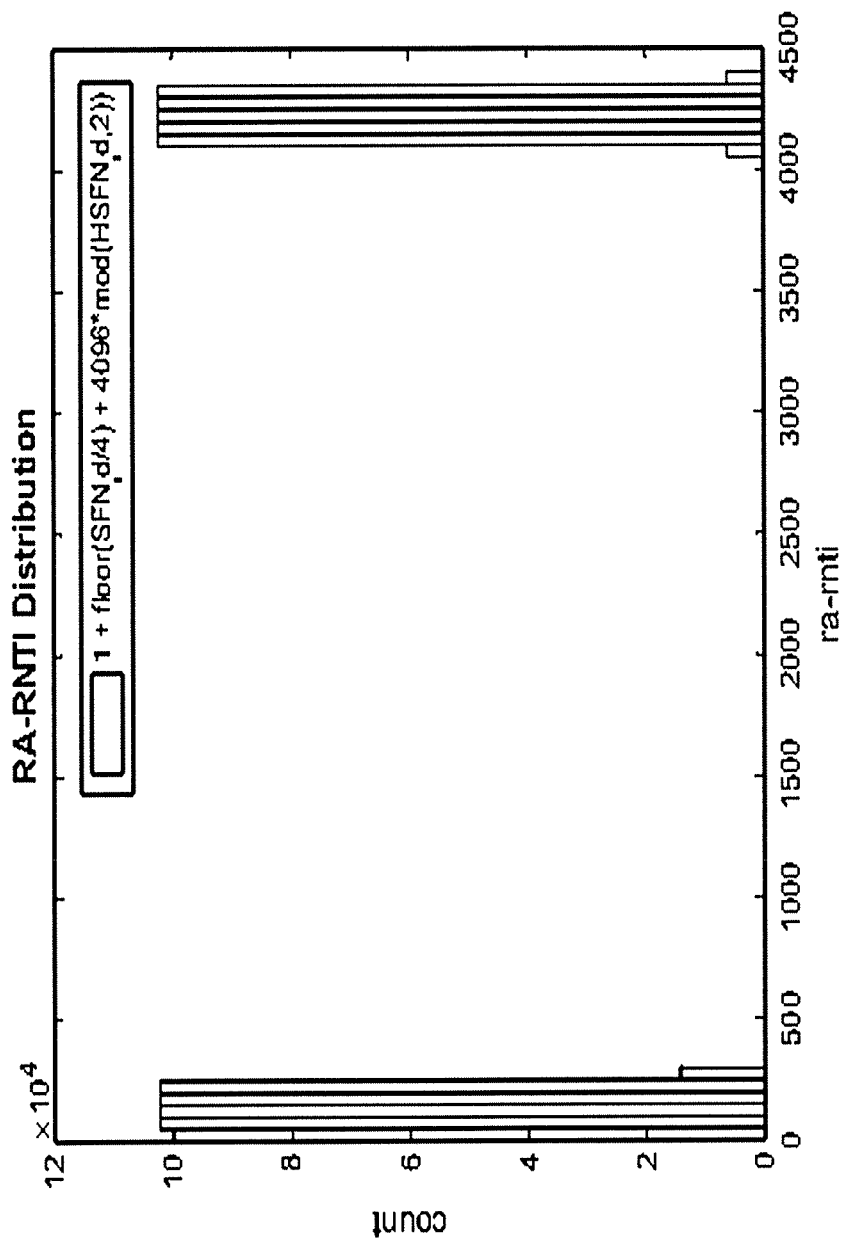

The above expression results in a distribution having two pronounced peaks at the start and end of the RA-RNTI range, see FIG. 8B.

The RA-RNTI set(s) or range(s) resulting from the examples above can span a very large range of RNTI values which can leave very few RNTIs available to use as, for example, C-RNTI or another RNTI type. However, all the RA-RNTI may not be used. Thus, as an embodiment, a method within a network node (e.g., the network node QQ160 discussed above), such as an access network node, is proposed as follows:

the network node determines, based on knowledge about the PRACH configurations, which RA-RNTIs do not correspond to valid PRACH opportunities;

the network node allocates (or "remaps") RNTIs serving as RA-RNTIs which do not correspond to valid PRACHs to RNTIs to be used as, e.g., other types of RNTIs such as C-RNTIs, SPS-RNTIs, etc.

the network node assigns allocated ("remapped") RNTIs as, e.g., C-RNTIs to UEs.

The RNTI remapping mitigates or reduces C-RNTI shortage due to the RA-RNTI range expansion. When PRACH configuration is changed, the network node may revoke some C-RNTIs and redo RNTI (re-)mapping. Alternatively (or as a complement) to revoking/reassigning C-RNTIs, the network node could, if urgency of reconfiguration is not too high, plan ahead and reserve RNTIs needed for the new PRACH configuration when they are (naturally) freed as connections are released. It should be noted that when it herein says PRACH it may also comprise similar channels such as NPRACH.

The embodiments discussed above and illustrated in the drawings may in particular be implemented in the context of NB-IoT TDD. Several exemplary realizations of such NB-IoT TDD embodiments will now be discussed in greater detail.

For NB-IoT wireless devices (UEs) operating in TDD mode the RA-RNTI associated with the PRACH in which the Random Access Preamble is transmitted can be computed in accordance with any of the expressions given above. For a uniform RA-RNTI distribution and an efficient use of the available RA-RNTI range the RA-RNTI may thus, for example, be derived using the following expression:

$$RA\text{-}RNTI=1+Floor(SFN/4)+256*mod(HFN,2).$$

As explained above, SFN stands for System Frame Number and, thus, for the first radio frame of the specified PRACH. In a similar manner, HFN stands for Hyper Frame Number and, thus, for the index of the first hyper frame of the specified PRACH. The PDCCH transmission and the PRACH resource may be on the same carrier.

The above expression, and similar expressions, are advantageous not only in regard to their uniform distribution of RA-RNTIs, but also in that the SFNs and HFNs can easily be mapped to RA-RNTI values and in that the mapping is unambiguous within the SFN/HSFN range (or window).

The first releases (Rel-13 and Rel-14) of NB-IoT were only supported with FDD. As part of Rel-15 further NB-IoT enhancements (see RP-170732, "New WI on Further NB-IoT enhancements", RAN #75), it has been decided to provide support for NB-IoT TDD. In the following embodiments, the impacts of TDD on one important functionality namely NPRACH are discussed. Most concepts of FDD NB-IoT can be re-used for TDD, however, it is of course necessary to ensure that no additional updates are needed for fully functioning TDD NB-IoT.

The radio resource, i.e., bandwidth (One PRB), of NB-IoT is significantly reduced compared to other current RATs. This is to ensure an efficient system with very low power consumption and good coverage. Further, by selecting such limited bandwidth it is possible to reuse spectrum previously used by GSM. Generally, repetitions are used to provide coverage enhancements. All necessary functionality (primarily from LTE) has been adapted to work for NB-IoT.

As explained previously, there is a fundamental difference between TDD and FDD, as the name implies. In FDD communication of UL and DL are separated on different frequencies. However, in TDD mode, uplink and downlink resources are allocated within the same frame but resources are split in time, see available LTE configurations in FIG. 2.

NB-IoT is developed to operate almost as FDD or TDD, namely with half-duplex. Similar to TDD UL and DL traffic cannot be transmitted at the same time.

The physical layer random access preambles are used by NB-IoT UEs camping on a given cell to let the base station know that the UE intends to get access. Overall (FDD) NPRACH characteristics of exemplary embodiments may be defined as follows:

- A preamble consists of four symbol groups transmitted next to each other using a different subcarrier per symbol group.
- Each symbol group has a Cyclic Prefix (CP) followed by 5 symbols, the CP has different duration depending on the preamble format.
- Both deterministic hopping tone pattern and pseudo-random hopping can be used.
- The NPRACH tone spacing is 3.75 KHz.
- A NPRACH preamble repetition unit is 5.6 ms or 6.4 ms depending on the CP.
- The number of repetitions can be 1, 2, 4, 8, 16, 32, 64, or 128.

The design adopted for pre-amble repetitions in FDD NB-IoT presents a challenge when adapting NPRACH for TDD NB-IoT. In principle, there is no TDD configuration that in terms of contiguous subframes in UL can host the NPRACH preamble repetition designed for FDD NB-IoT (i.e., the preamble repetition unit of NPRACH goes beyond 5 ms, it can be 5.6 ms or 6.4 ms depending on the CP).

The embodiments presented herein avoid wrap around issues in regard to RA-RNTI. Some embodiments are based on expression for deriving RA-RNTI that are advantageous in regard to a uniform distribution of the calculated RA-RNTIs. Some embodiments ensure that the SFNs and HFNs can easily be mapped to RA-RNTI values and that the mapping is unambiguous within the SFN/HSFN range (or window).

While the present disclosure has been described with reference to exemplary embodiments, it will be readily apparent that the present disclosure may be modified in many ways. As such, the invention is only limited by the claims appended hereto.

ABBREVIATIONS

At least some of the following abbreviations have been used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CE Coverage Enhancement
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HFN Hyper Frame Number
HO Handover
HSPA High Speed Packet Access
HRPD High Rate Packet Data
IoT Internet of Things
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NB Narrow Band
NPBCH NP Physical Broadcast Channel
NPDCCH Narrowband Physical Downlink Control Channel
NPRACH NB-IoT PRACH
NR New Radio
NRS Narrowband Reference Signal
NSSS Narrowband Secondary Synchronization Signal
NPSS Narrowband Primary Synchronization Signal
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RA Random Access
RA-RNTI Random Access Resource Radio Network Temporary Identifier
RAT Radio Access Technology
RLM Radio Link Management
RNC Radio Network Controller
RNTI Radio Network Temporary Identifier
RRC Radio Resource Control
RRM Radio Resource Management RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block/System Information Broadcast
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

REFERENCES

[1] Y. P. E. Wang, X. Lin, A. Adhikary, A. Grovlen, Y. Sui, Y. Blankenship, "J. Bergman, and H. S. Razaghi, "A primer on 3GPP narrowband internet of things," IEEE Commun. Mag., vol. 53, no. 3, pp. 117-123, March 2017.
[2] RP-170732, "New WI on Further NB-IoT enhancements", RAN #75.
[3] 3GPP, 36.321ve30 "Medium Access Control (MAC) protocol specification", 2017-06 and/or 2017-07
[4] 3GPP TS 36.211, "Physical channels and modulation", v14.2.0.

The invention claimed is:

1. An apparatus configured to determine a Random Access-Radio Network Temporary Identifier (RA-RNTI) for use in a radio network system, the apparatus comprising:
a first counter configured to be incremented after a pre-defined period of time and to be re-set when having reached a predefined first number, wherein the first counter counts a first count;
a second counter configured to be incremented when the first counter reaches the predefined first number and to be re-set when having reached a predefined second number, wherein the second counter counts a second count; and
a third counter configured to be incremented when the second counter reaches the predefined second number and to be re-set when having reached a predefined third number, wherein the third counter counts a third count; and processing circuitry configured to determine an RA-RNTI based on a mathematical formula that includes both the second count and the third count,
wherein the mathematical formula is $$\text{RA-RNTI} = 1 + \text{floor}((b+(c+1)*\text{mod}(d,e))/z) + f, \text{ wherein}$$

b is the second count;
c is the second predefined number;
d is the third count;
e is an integer including 1;
z is an integer including 1; and
f is an integer including 0, 1 or a number >1.

2. The apparatus of claim 1, wherein:
b is a system frame number;
c=1023;
d is a hyper frame number;
e=2 or 4; and
z=4.

3. The apparatus of claim 1, wherein the processing circuitry is configured to determine a number x of different RA-RNTIs that exceeds a constant a plus the floor of the pre-defined second number y divided by a constant z so that $$x > a + \text{floor}(y/z).$$

4. The apparatus of claim 3, wherein
a=1 or a=1 plus 256 times a maximum uplink carrier index;
y=1023;
z=4.

5. The apparatus of claim 1, wherein $$f = (c+1)*e/z*\text{carrier\_id, wherein}$$

carrier_id is an uplink carrier index.

6. The apparatus of claim 1, wherein the processing circuitry is configured to determine the RA-RNTI based on an expression that yields a uniform distribution of RA-RNTI values.

7. The apparatus of claim 1, wherein the apparatus is a wireless device and wherein the RA-RNTI identifies at least a time resource for transmission of a random access message by the wireless device.

8. The apparatus of claim 1, wherein the apparatus is a wireless device and wherein the processing circuitry is configured to determine the RA-RNTI responsive to a decision that a random access is to be performed.

9. The apparatus of claim 1, wherein the apparatus is a wireless device and wherein the processing circuitry is configured to perform at least one of the following procedures:
generate a random access request message in accordance with the RA-RNTI and send the random access request message towards an access network;
identify a random access response message from the access network associated with the RA-RNTI.

10. The apparatus of claim 1, wherein the apparatus is a Narrowband Internet of Things User Equipment (NB-IoT) UE, and wherein the processing circuitry is configured to determine the RA-RNTI for a Time Division Duplex (TDD) mode.

11. The apparatus of claim 1, wherein the apparatus is an access network node configured to determine a Random Access-Radio Network Temporary Identifier (RA-RNTI) for use in a radio network system, the access network node further comprising:
communication interface circuitry configured to receive a random access message from a wireless device;
wherein the RA-RNTI is associated with the random access message and wherein the processing circuitry is configured to determine the RA-RNTI based on a mathematical formula that includes both the second count and the third count at the time when the random access message was received.

12. The apparatus of claim 11, wherein the processing circuitry is configured to generate a random access response that includes the RA-RNTI and send the random access response to the wireless device.

13. The apparatus of claim 11, wherein the processing circuitry is configured to:
manage a first RNTI type comprising a number of designated RA-RNTIs available for use in the radio network system and at least one second RNTI type different from the first type;
determine, based on a priori-knowledge, one or more designated RA-RNTIs available but unused in the radio network system; and
allocate the one or more unused designated RA-RNTIs to the second RNTI type.

14. The apparatus of claim 13, wherein the a priori-knowledge relates to communication opportunities on a transmission channel.

15. A method of determining a Random Access-Radio Network Temporary Identifier (RA-RNTI) for use in a radio network system, the method comprising:
operating a first counter configured to be incremented after a pre-defined period of time and to be re-set when having reached a predefined first number, wherein the first counter counts a first count;
operating a second counter configured to be incremented when the first counter reaches the predefined first number and to be re-set when having reached a predefined second number, wherein the second counter counts a second count; and
operating a third counter configured to be incremented when the second counter reaches the predefined second number and to be re-set when having reached a predefined third number, wherein the third counter counts a third count; and
determining an RA-RNTI based on a mathematical formula that includes both the second count and the third count,
wherein the mathematical formula is $$\text{RA-RNTI} = 1 + \text{floor}((b+(c+1)*\text{mod}(d,e))/z) + f, \text{ wherein}$$

b is the second count;
c is the second predefined number;
d is the third count;
e is an integer including 1;
z is an integer including 1; and
f is an integer including 0, 1 or a number >1.

16. The method of claim 15, wherein
b is a system frame number;
c=1023;
d is a hyper frame number;
e=2 or 4; and
z=4.

17. The method of claim 15, the method being performed by an access network node and comprising:
receiving a random access message from a wireless device; and
wherein the RA-RNTI is associated with the random access message and wherein determining the RA-RNTI associated with the random access message is based the second count and the third count at the time when the random access message was received.

\* \* \* \* \*

UNITED STATES PATENT AND TRADEMARK OFFICE
CERTIFICATE OF CORRECTION

| | | |
|---|---|---|
| PATENT NO. | : 11,229,058 B2 | |
| APPLICATION NO. | : 16/637958 | |
| DATED | : January 18, 2022 | |
| INVENTOR(S) | : Shreevastav et al. | |

It is certified that error appears in the above-identified patent and that said Letters Patent is hereby corrected as shown below:

On the Title Page

In the Figure, for Tag "QQ122", in Line 2, delete "Tranceiver" and insert -- Transceiver --, therefor.

In the Figure, for Tag "QQ172", in Line 1, delete "Tranceiver" and insert -- Transceiver --, therefor.

In the Drawings

Fig. 3, Sheet 3 of 11, for Tag "QQ122", in Line 2, delete "Tranceiver" and insert -- Transceiver --, therefor.

Fig. 3, Sheet 3 of 11, for Tag "QQ172", in Line 1, delete "Tranceiver" and insert -- Transceiver --, therefor.

Fig. 5, Sheet 6 of 11, for Step "520", in Line 1, delete "DECSION" and insert -- DECISION --, therefor.

In the Specification

Column 1, Line 64, delete "field" and insert -- field) --, therefor.

Column 4, Line 17, delete "PRACH" and insert -- PRACH. --, therefor.

Column 5, in Equation, Line 65, delete "RA-RNTI=1+floor(($b$/4)+1024*mod($d$,2), wherein" and insert -- RA-RNTI=1+floor(($b$/4)+1024*mod($d$,2)), wherein --, therefor.

Column 7, Line 7, delete "released)" and insert -- released). --, therefor.

Column 7, in Equation, Line 24, delete "RA-RNTI=1+floor(($b$/4)+1024*mod($d$,2), wherein" and insert -- RA-RNTI=1+floor(($b$/4)+1024*mod($d$,2)), wherein --, therefor.

Signed and Sealed this
Seventeenth Day of May, 2022

Katherine Kelly Vidal
*Director of the United States Patent and Trademark Office*

Column 8, Line 58, delete "illustrates" and insert -- illustrate --, therefor.

Column 10, Line 61, delete "NodeB's." and insert -- NodeBs. --, therefor.

Column 11, Line 36, delete "(SOC)." and insert -- (SoC). --, therefor.

Column 11, Line 47, delete "functionality" and insert -- functionalities --, therefor.

Column 11, Line 53, delete "functionality" and insert -- functionalities --, therefor.

Column 12, Lines 63-64, delete "front end circuitry QQ190" and insert -- front end circuitry QQ192 --, therefor.

Column 15, Line 4, delete "front end circuitry QQ114" and insert -- front end circuitry QQ112 --, therefor.

Column 16, Line 1, delete "functionality" and insert -- functionalities --, therefor.

Column 16, Line 7, delete "functionality" and insert -- functionalities --, therefor.

Column 18, Line 50, delete "by the step" and insert -- by step --, therefor.

Column 19, Line 2, delete "defined in by" and insert -- defined by --, therefor.

Column 19, Line 44, delete "such a" and insert -- such as --, therefor.

Column 20, Line 13, delete "such a" and insert -- such as --, therefor.

Column 20, Line 37, delete "an non-temporary" and insert -- a non-temporary --, therefor.

Column 20, Line 44, delete "some one" and insert -- some --, therefor.

Column 22, in Equation, Line 6, delete "RA-RNTI=1+Floor((SFN+1024*mod(HFN,$n$))/4." and insert -- RA-RNTI=1+Floor((SFN+1024*mod(HFN,$n$))/4). --, therefor.

Column 22, in Equation, Line 9, delete "RA-RNTI=1+Floor((SFN/4+256*mod(HFN,$n$))." and insert -- RA-RNTI=1+Floor((SFN/4)+256*mod(HFN,$n$)). --, therefor.

Column 22, in Equation, Line 14, delete "RA-RNTI=1+Floor((SFN/4+256*mod(HFN,2))." and insert -- RA-RNTI=1+Floor((SFN/4)+256*mod(HFN,2)). --, therefor.

Column 22, Line 52, delete "etc." and insert -- etc.; --, therefor.

Column 24, Line 27, delete "an" and insert -- any --, therefor.

Column 24, Line 42, delete "Multiplexing" and insert -- Multiplex --, therefor.

CERTIFICATE OF CORRECTION (continued)
U.S. Pat. No. 11,229,058 B2

Column 25, Line 18, delete "Services" and insert -- Service --, therefor.

Column 26, Line 46, delete "2017-07" and insert -- 2017-07. --, therefor.

In the Claims

Column 27, Lines 57-58, Claim 10, delete "(NB-IoT) UE," and insert -- (NB-IoT UE), --, therefor.

Column 28, Line 67, Claim 17, delete "based the" and insert -- based on the --, therefor.